Nov. 29, 1938. A. J. LEWIS 2,138,495
BOX FASTENER MACHINE
Filed Sept. 4, 1937 10 Sheets-Sheet 1

Inventor:
Arthur J. Lewis.
by Roberts, Cushman & Woodbury
Attys.

Nov. 29, 1938.  A. J. LEWIS  2,138,495
BOX FASTENER MACHINE
Filed Sept. 4, 1937  10 Sheets-Sheet 2

Inventor:
Arthur J. Lewis,
by Roberts, Cushman & Woodbury
his Attys.

Patented Nov. 29, 1938

2,138,495

UNITED STATES PATENT OFFICE 2,138,495

BOX FASTENER MACHINE

Arthur J. Lewis, Stratford, Conn., assignor to The Mason Box Company, Attleboro Falls, Mass., a corporation of Massachusetts Application September 4, 1937, Serial No. 162,523

16 Claims. (Cl. 140—93)

This invention relates to the application of wire fasteners to boxes, envelopes, wrappers and other articles made of sheet material, in the general manner disclosed in the patent to Berthold No. 1,825,140, which comprises shaping a staple, driving the staple through the sheet material near one edge, bending the loop portion and free ends of the staple toward said edge and then bending the ends over the edge and over two sides of the loop respectively. As disclosed in the aforesaid patent the sides of the loop are parallel to each other and the free ends of the staple diverge from the points where they pass through the sheet material to the edge of the sheet, thence curving obliquely over said edge and over the straight sides of the loop. While this old method is fairly satisfactory it has certain disadvantages.

The objects of the present invention are to provide a method and apparatus which avoid the aforesaid disadvantages, which afford a more economical and effective mode of manufacture, and generally to improve the art of applying wire fasteners or the like to sheet material.

In one aspect of the present invention the staple is formed, in the attaching machine, with offsets in its legs at the aforesaid edge of the sheet material, and the ends of the staple are bent substantially straight toward said edge instead of obliquely (converging or diverging) as in the aforesaid patent, the tips of said ends being crimped obliquely over the edge and over the said offset portions of the loop, thereby simplifying the process of manufacture and affording a better product.

In another aspect the invention involves a tool for bending a wire end toward the aforesaid edge and thence bending it over the edge, the operative portion of the tool having a compound movement comprising two components, one approximately parallel to the plane of the sheet to effect the first bending operation and the other transversely of said plane to effect the second bending operation. This is preferably accomplished by a wiper, curved in cross-section, protruding from the side of the tool laterally of the plane of its path of movement. Thus these two bending operations are effected with a single tool instead of two tools as in the aforesaid patent.

In still another aspect the invention comprises a single tool for bending the wire end over the wire on the other side of the sheet (one leg of a staple loop for example) and then crimping the tip of the end into or adjacent to the surface of the sheet. This tool preferably has a nose which moves approximately parallel to or along the sheet to push the wire end over the loop leg and then moves toward the sheet to crimp the tip of the wire into or near the sheet. Thus the tool performs two operations which required separate tools in the aforesaid patent.

Other aspects of the invention will be evident from the illustrative embodiment shown in the accompanying drawings in which the first fifteen figures are more or less diagrammatic and in which the arrows indicate direction of movement of the parts.

Fig. 18 is a top plan view of the mechanism for actuating the end-crimping tools;

Figure 3:
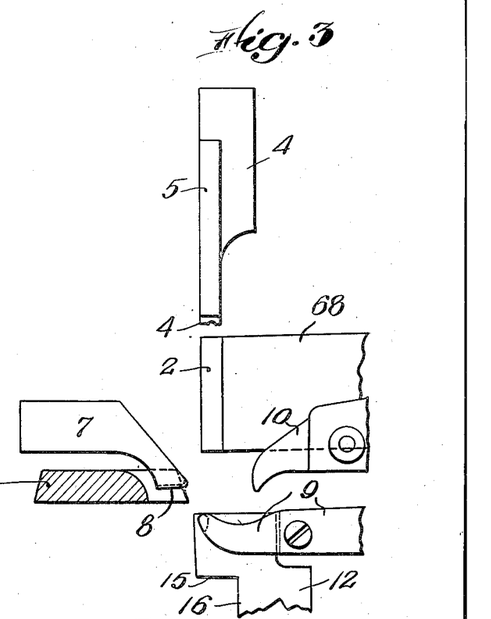
Fig. 3 is a side elevation showing the parts in the same position.
Figure 17:
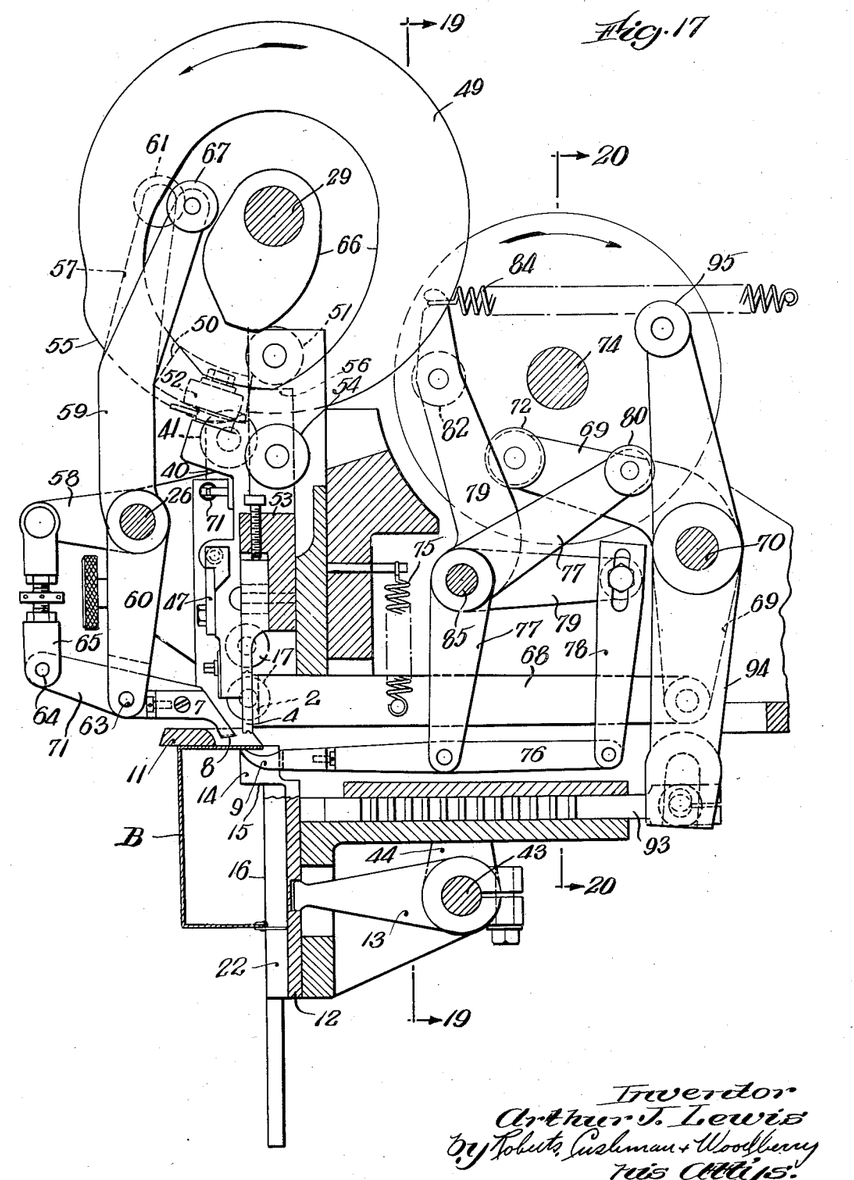
Fig. 17 is a vertical central section from front to rear.

The particular embodiment of the invention chosen for the purpose of illustration comprises suitable wire feeding mechanism, an adjustable stop 1 in the path of the wire W, an anvil 2 over which the staple is formed, the anvil having a narrow upper end and a wider lower end with offset shoulders 3 therebetween, a driver 4, staple-forming jaws 5 having grooves in their opposing faces to receive the wire and having offset shoulders 6 corresponding to the shoulders 3 on the anvil, a loop folder 7 having grooves 8 in its nose to receive the two sides of the loop, end-bending tools 9, end-crimping tools 10, a plate 11 against the lower side of which one side of the box B is placed with the open end of the box facing toward the rear, a vertically movable clamp 12 for clamping the side of the box against the bottom of the plate 11 and a rock arm 13 for moving the clamp 12 up and down. The clamp 12 has a narrow upper end 14 extending between the end-bending tools 9 and the clamp is offset as shown at 15 (Fig. 3) to accommodate the lower side of the box, the front surface 16 of the clamp serving to limit the insertion of the box to the proper position and having a recess 22 to receive a fastener on the lower side of the box (Fig. 17).

Figure 4:
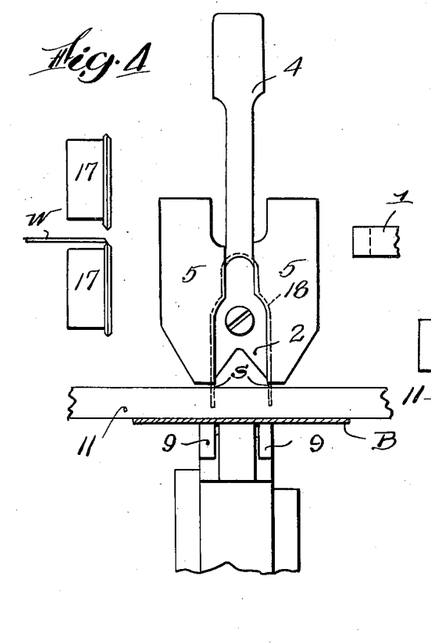
Fig. 4 is a front elevation showing the wire cut off and shaped into the form of a staple.
Figure 5:
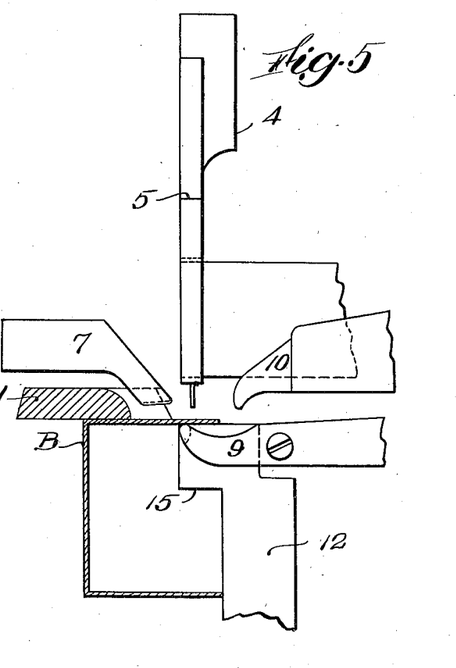
Fig. 5 is a side elevation of the parts in the same position.
Figure 6:
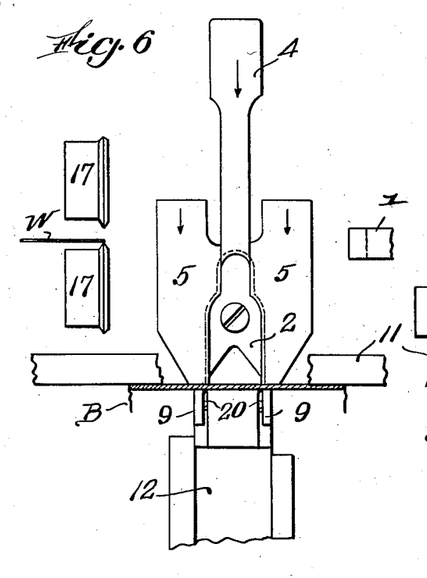
Fig. 6 is a front elevation showing the staple as it enters the sheet material.
Figure 7:
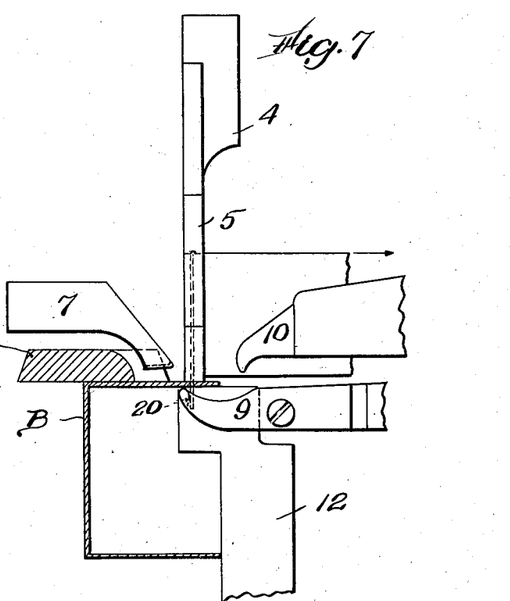
Fig. 7 is a side elevation of the parts in the same position.
Figure 8:
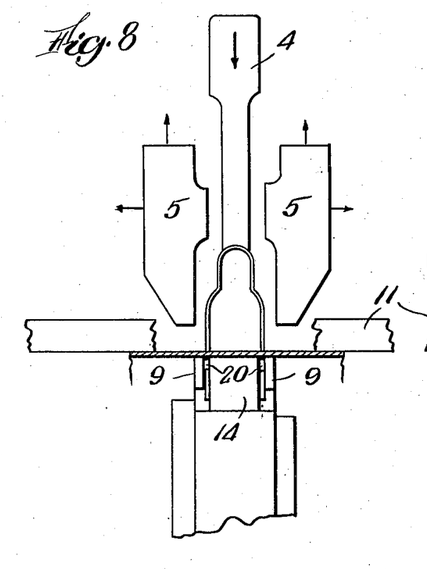
Fig. 8 is a front elevation showing the staple fully inserted.
Figure 9:
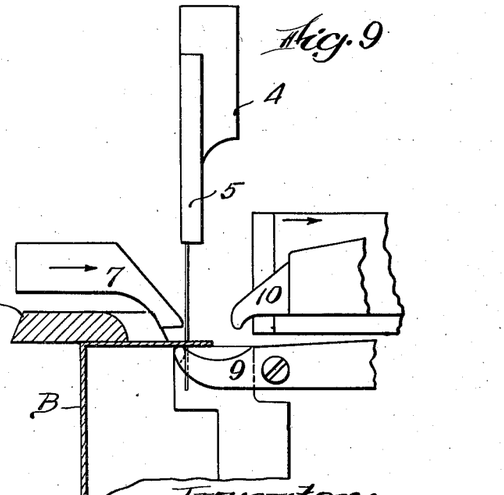
Fig. 9 is a side elevation showing the parts in the same position.

After the end of the wire stock has been fed to the stop 1 the proper length for a staple is severed by cutters 17. Substantially simultaneously with the severing of the wire, or slightly therebefore, the driver 4 descends far enough to clamp the wire against the top of the anvil 2. After the wire is severed the staple-forming jaws 5 descend to the position shown in Figs. 4 and 5 to form the staple S with offset portions at 18. After the staple is formed to the shape shown in Fig. 4 the jaws 5 continue to descend, the driver 4 and the anvil 2 moving with the jaws, to drive the staple through the box B to the position shown in Figs. 6 and 7. At this point the anvil 2 moves to the rear (to the right in Figs. 7 and 9) out of the path of the staple, and the driver 4 continues to drive the staple to the position shown in Figs. 8 and 9. After the staple is driven the jaws 5 move apart and return to their upper position.

Figures 1, 23:
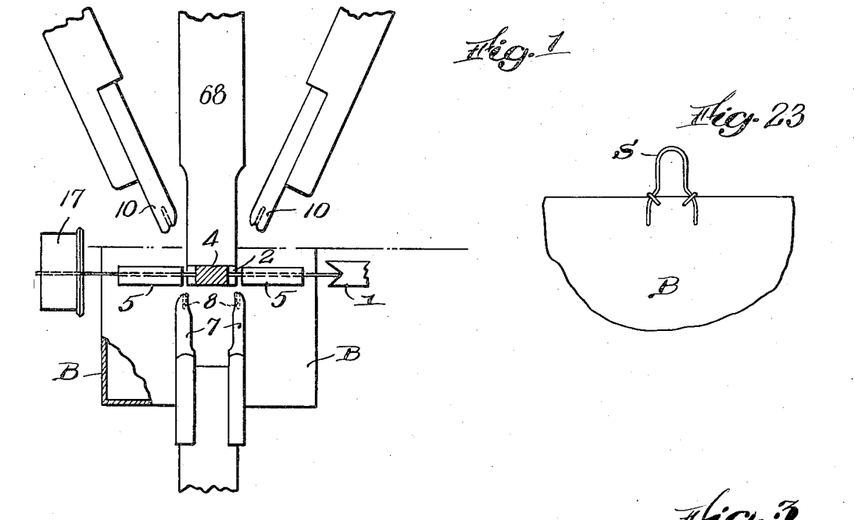
Fig. 1 is a plan view showing a length of wire fed into position to be shaped into the form of a staple and applied to a box.
Fig. 23 is a side view of a portion of a box with a fastener applied thereto.
Figure 2:
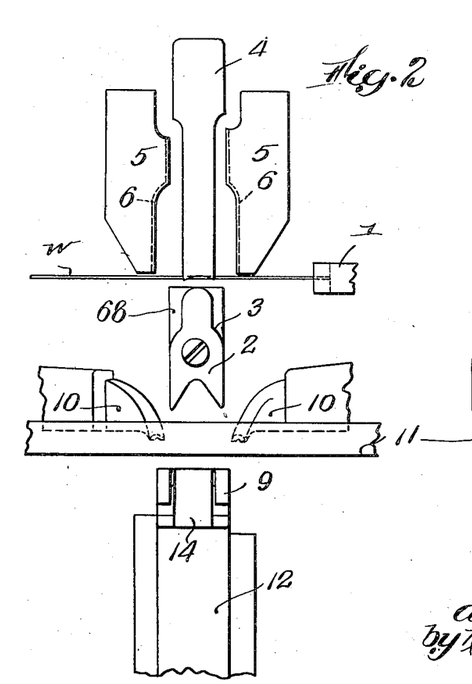
Fig. 2 is a front elevation of the parts in the same position.
Figures 10, 12:
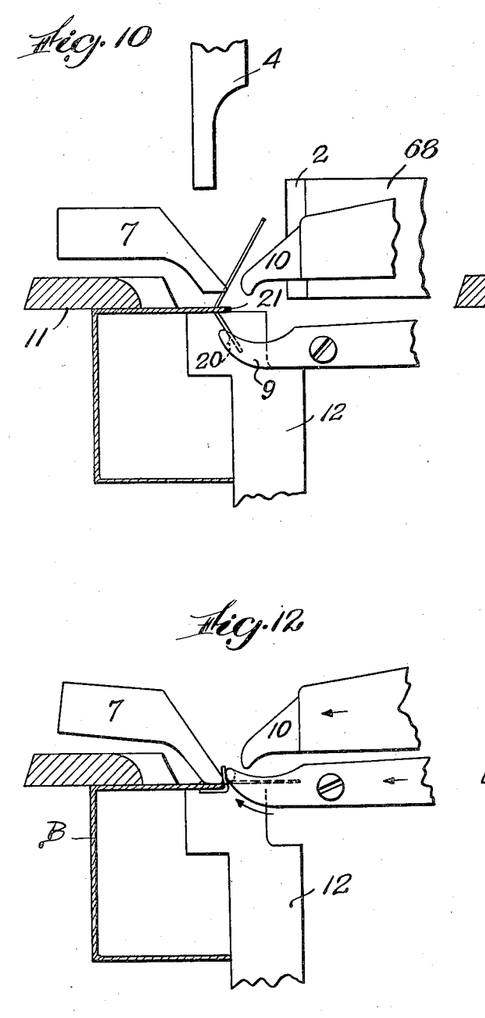
Fig. 10 is a side elevation showing the loop and ends of the staple partly bent along opposite sides of the sheet material.
Fig. 12 is a side elevation showing the parts in the positions they occupy at the end of the second component of movement of the end-bending tools.
Figure 11:
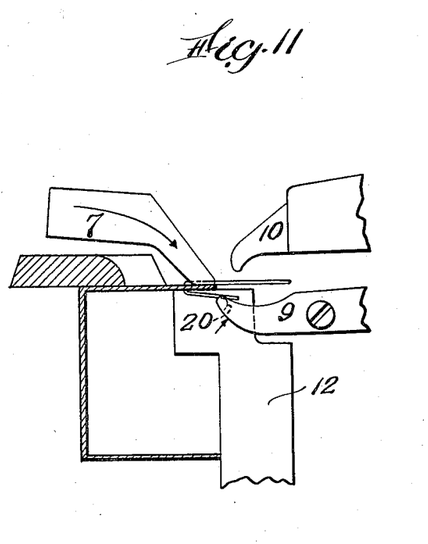
Fig. 11 is a side elevation showing the loop fully bent and the ends bent as far as they are bent in the first component of movement of the end-bending tools.
Figure 13:
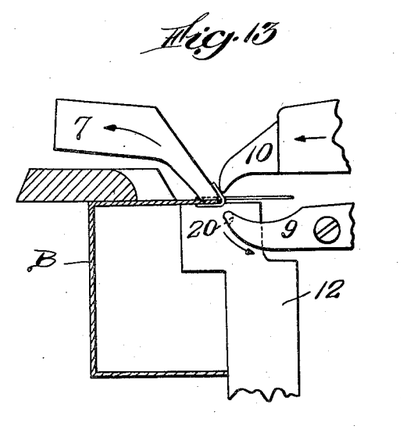
Fig. 13 is a side elevation showing the parts in their positions which they occupy as the end-crimping tools start to crimp the ends of the staple.
Figure 14:
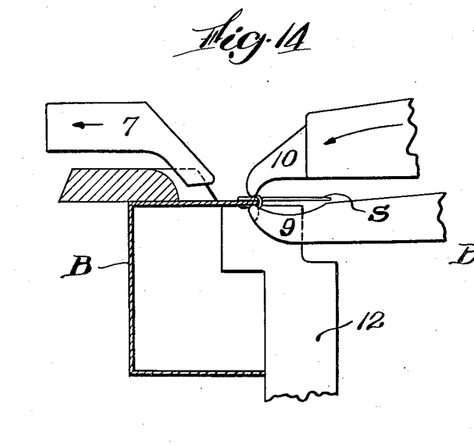
Fig. 14 is a similar view showing the parts in the positions which they occupy during the second component of movement of the end-crimping tools toward the sheet of material.

The end-bending tools 9 are spaced from the sides of the box clamp 14 just far enough to receive the legs of the staple therebetween, and projecting across the space between each tool and the clamp is a wiper 20 which is curved in cross-section as shown in Figs. 3, 5, 7, 9, 11, 13 and 14, these wipers protruding immediately in front of the downwardly projecting ends of the staple. After the staple is driven through the box to the position shown in Figs. 8 and 9 the loop folder 7 moves to the rear (to the right in Fig. 10) to bend the loop end of the staple toward said edge. Near the end of the rearward movement of the loop folder its operative end also moves downwardly to set the loop in parallel juxtaposition to the outside of the box as shown in Fig. 11. Simultaneously with the rearward movement of the tool 7 the end-forming tools 9 move to the rear to bend the legs directly toward the edge 21 of the box, as shown in Figs. 10 and 11. After the tools 9 reach the position shown in Fig. 11 they move upwardly to the position shown in Fig. 12, causing the wipers 20 to bend the ends of the staple upwardly over the edge of the box. The tools 9 then move out of the way and the end-crimping tools 10 move forwardly to the position shown in Fig. 13. The loop folder 7 then retracts forwardly, the end-crimping tools continuing to advance lengthwise, thereby to bend the staple ends obliquely over the offset portions 18 of the staple. At or near the end of the lengthwise movement of the tools 10, their forward ends move downwardly to crimp the tips of the staple into or near the outer surface of the box. At the end of the cycle of movements indicated by the arrows in the various figures the parts return to the positions shown in Figs. 1, 2 and 3, whereupon the box may be removed and another box inserted.

The mechanism for clamping the box B against the lower side of the plate 11 (Fig. 17) comprises the aforesaid arm 13 fast to rock-shaft 43 which is actuated by arm 44 (Fig. 19) carrying a cam roll 45 engaging a cam 46 on shaft 29.

Figure 16:
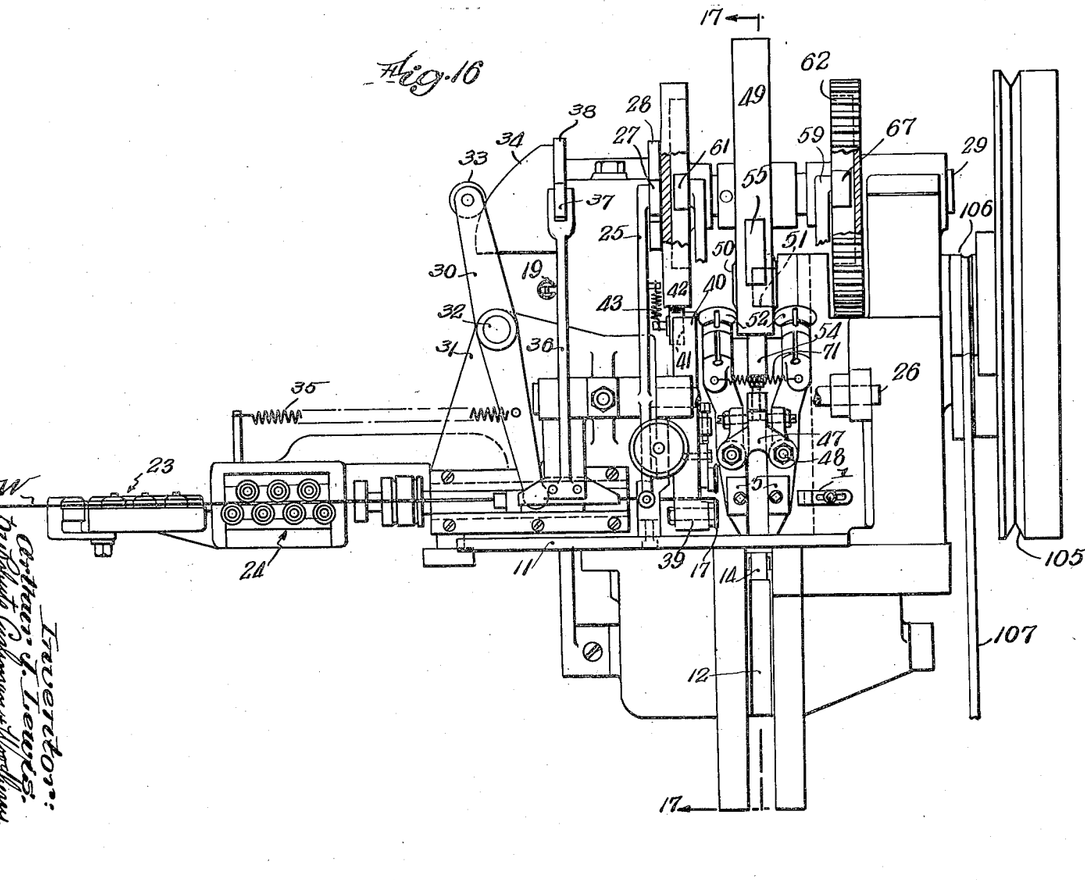
Fig. 16 is a front elevation of the machine.

As shown in Fig. 16 the mechanism for feeding the wire to the machine comprises a series of horizontal rolls 23, a series of vertical rolls 24, a lever 25 pivoted on shaft 26 for clamping the wire in advance position, the upper end of the lever carrying a roll 27 engaging a cam 28 on shaft 29 and the lower end of the lever pressing the wire against a stationary abutment, a rock-lever 30 pivoted on the frame 31 at 32 for advancing the wire with its lower end, the upper end of the lever having a roll 33 engaging a cam 34 for moving the upper end of the lever to the left, a spring 35 for returning the lever in the opposite direction, a lever 36 pivoted on shaft 26 for holding the lower end of the lever 30 in clamping relationship with the wire during the advanced movement of the wire, the upper end of the lever carrying a roll 37 associated with cam 38 and having a spring 19 for holding the roll against the cam. The lower cutter 17 is journalled at 39 and the upper cutter is mounted on a vertically-reciprocating carriage 40 carrying a cam roll 41 engaging cam 42, a spring 43 being provided to keep the roller against the cam.

The mechanism for actuating the staple-forming jaws 5 comprises a verticaly-reciprocating carrier 47 to which the jaws are pivoted at 48. The carrier is reciprocated up and down by means of a cam 49 having a cam groove 66 engaging a cam follower roll 51 on the carrier. The upper ends of the jaws 5 carry rolls 52 which bear on opposite sides of the cam 49 respectively. The cam 49 carries raised cams 50 which engage the rolls 52 after the wire has been bent over the anvil to squeeze the lower ends of the jaws 5 against the sides of the anvil to set the staple in its final shape.

The driver 4 is mounted on a vertically-reciprocating carriage 53 which carries a follower roll 54 which is actuated by a raised cam 55 on the outer periphery of the cam 49. The upper end of the carrier 53 engages a shoulder on the jaw carrier 47 as indicated at 56 in Fig. 17.

The mechanism for actuating the loop folder 7 comprises a holder 71, a bell-crank lever (Figs. 17 and 21) having an upwardly-extending arm 57 and a forwardly-extending arm 58, and a second bell-crank lever having an upwardly-extending arm 59 and a downwardly-extending arm 60. The upper ends of the arms 57 and 59 carry rollers 61 and 67 engaged by interior surfaces of cams 42 and 62 on shaft 29. The lower end of the arm 60 is bifurcated and the holder 71 is pivoted at 63 in this bifurcated end. The front end of the holder 71 is pivoted at 64 to an adjustable link 65, the upper end of which is pivotally interconnected with the forward end of the arm 58. Thus, as the arms 57, 58, 59 and 60 move in a counterclockwise direction (Fig. 17) the operative rearward end of the tool 7 moves to the rear and downwardly to bend the loop of the staple against the outside of the box as illustrated in Figs. 10 and 11.

Figure 19:
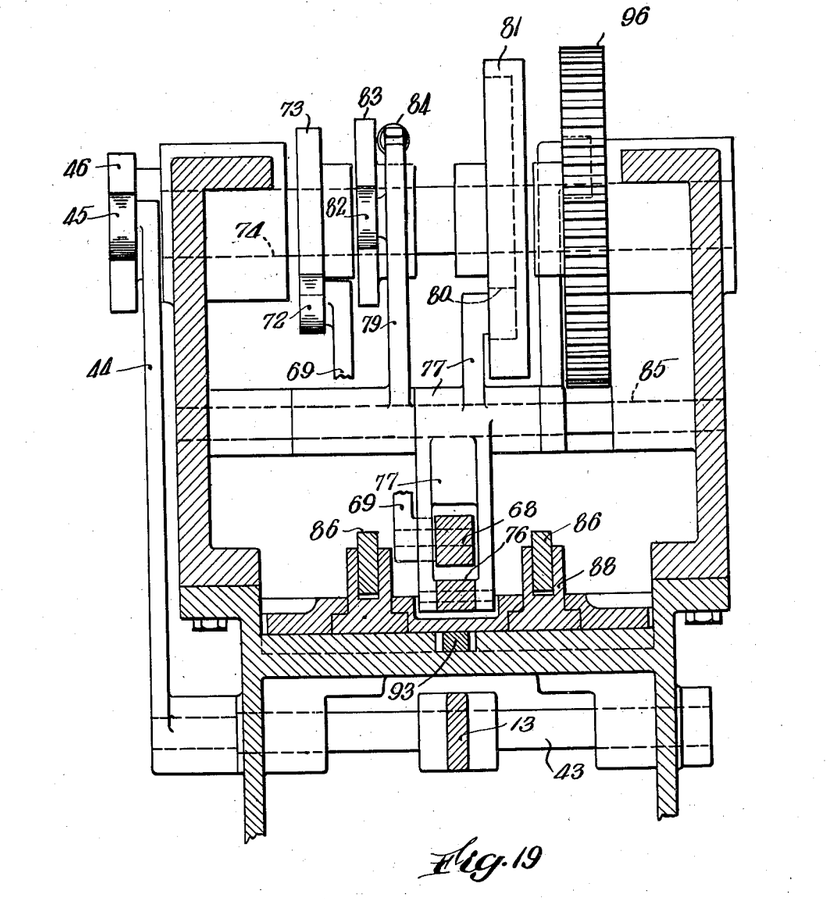
Fig. 19 is a section on line 19—19 of Fig. 17.

The anvil 2 is mounted on the forward end of an arm 68 (Fig. 17), the rearward end of which is pivotally interconnected with a lever 69 pivoted on shaft 70, the upper end of the lever carrying a roll 72 engaging the outer periphery of a cam 73 on shaft 74 (Fig. 19). A spring 75 yieldingly supports the forward end of the anvil bar 68 (Fig. 17).

The mechanism for operating the end-bending tools 9 (Fig. 17) comprises a bar 76 pivoted at the middle to the bell-crank lever 77, mounted on shaft 85, and at its rearward end to a link 78 the upper end of which is pivotally connected to one end of a bell-crank lever 79. The upper end of the bell-crank lever 77 carries a roll 80 which engages an interior cam surface of the cam 81 on shaft 74 (Fig. 19). The upper end of the bell-crank lever 79 carries a roll 82 which engages cam 83 on the shaft 74, a spring 84 being provided to hold the roll against the cam.

Figure 15:
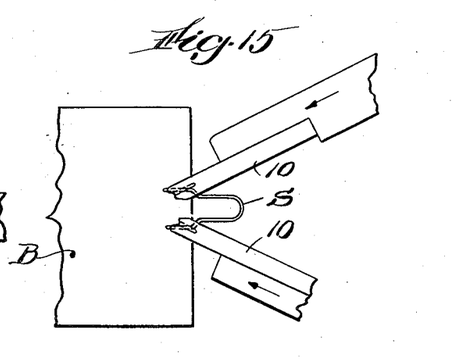
Fig. 15 is a plan view of the end-crimping tools in the same position shown in Fig. 14.
Figures 20, 21:
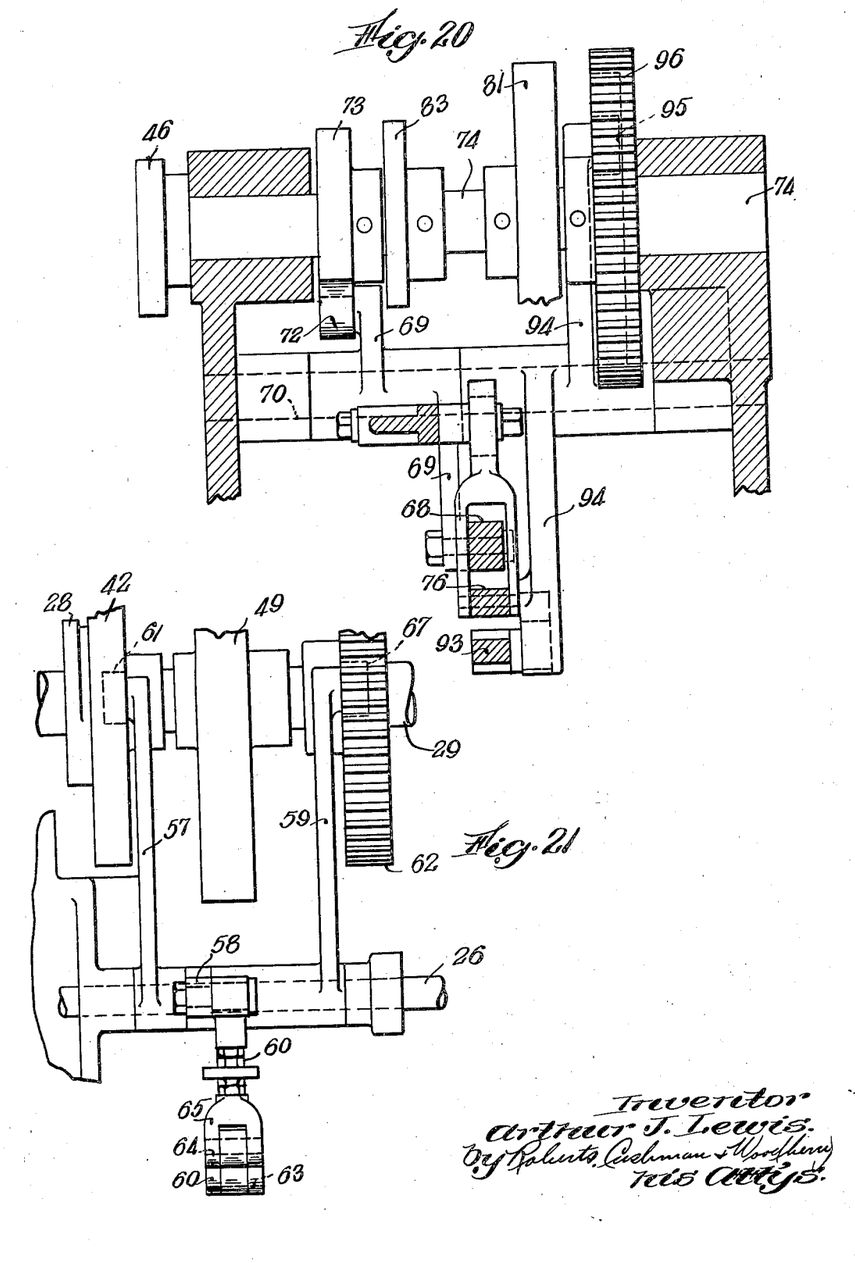
Fig. 20 is a section on line 20—20 of Fig. 17.
Fig. 21 is a front elevation of parts which are omitted from Fig. 16 for the sake of clearness and which are shown at the left-hand side of Fig. 17.
Figure 22:
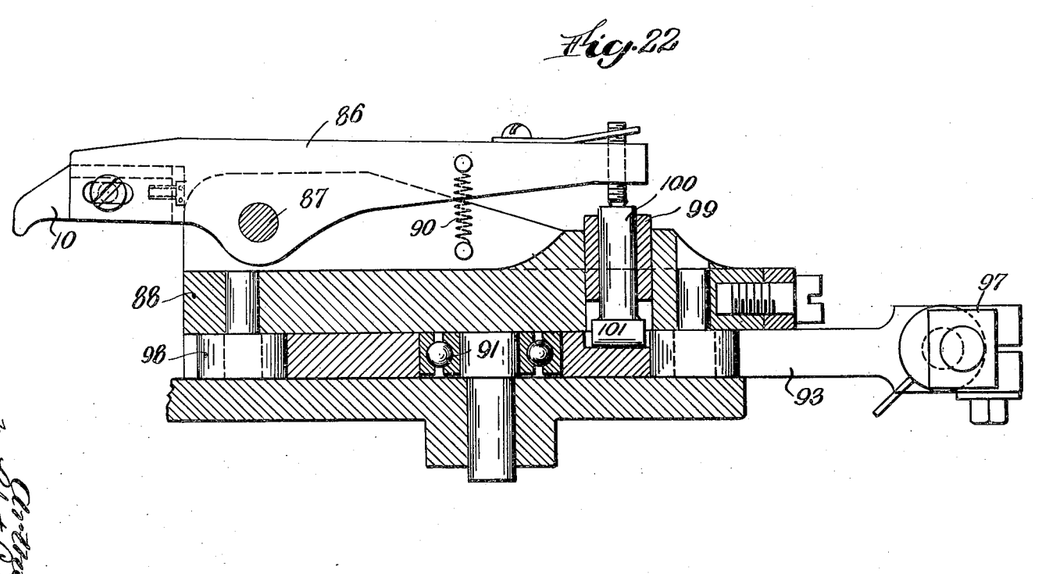
Fig. 22 is a section on line 22—22 of Fig. 18.

Referring particularly to Figs. 17, 18 and 22, the mechanism for actuating each of the end-crimping tools 10 comprises a lever 86 pivoted at 87 to a carriage 88 which reciprocates back and forth lengthwise of the lever, a spring 90 being provided to urge the lever in a clockwise direction (Fig. 22). Mounted beneath each reciprocating carriage on a ball-bearing 91 is a pinion 92 which is oscillated back and forth by a rack 93. As shown in Fig. 17 the rack is actuated by a lever 94 pivotally mounted on shaft 70 and carrying at its upper end a roll 95 actuated by cam 96 on the shaft 74 (Fig. 20). As shown in Figs. 17 and 22 the rack is connected to the lever 94 by an eccentric adjusting device 97. The pinion 92 is provided with a cam surface engaging the rolls 98 pivotally mounted under the carriage 88, thereby to reciprocate the carriage back and forth as the pinion oscillates back and forth. At the rear end of each carriage is a vertical opening carrying a bearing 99 for a vertically-reciprocating plunger 100. The lower end of the plunger is rounded as shown at 101 in Fig. 22 to engage in a cam depression 102 (Fig. 18) in the upper face of the pinion. The upper end of the plunger 100 is adjustably connected with the rearward end of the lever 86, the parts being so timed that after the carriage 88 has reciprocated forwardly from the position shown in Fig. 13 to the position shown in Figs. 14 and 15 the plunger 100 rides out of the depression 102 to tip the lever 86 in a counterclockwise direction (Fig. 22) thereby crimping the tip end of the staple into or near the outer surface of the box as above described.

As shown in Figs. 16, 19, 20 and 21 the cams 62 and 96 on shafts 29 and 74 have teeth on their outer periphery. These teeth mesh together to drive the two shafts in synchronism, power being supplied to shaft 74 through pulley 105 and clutch 106, the latter being controlled by link 107 leading to a foot-pedal and being of the automatic type to stop the machine after each cycle of operations.

It should be understood that the present disclosure is for the purpose of illustration only and that this invention includes all modifications and equivalents which fall within the scope of the appended claims.

I claim:

1. A machine for applying wire fasteners to the edge of a sheet of material comprising cooperating jaw and anvil means having shoulders for forming a U-shaped staple with offsets intermediate the ends of the legs of the staple, means for applying the staple to said sheet with the offsets at said edge, and means for folding the free ends of the legs over said edge and offsets.

2. A machine for applying wire fasteners to the edge of a sheet of material comprising cooperating jaw and anvil means having shoulders for forming a U-shaped staple with a loop portion and an end portion of different widths and offsets between the two portions, means for applying the staple to said sheet with said end portion extending through the sheet in spaced relation to said edge and folded along opposite sides of the sheet to said edge, and means for folding the free ends of said end portion over said edge and offsets.

3. A machine for applying wire fasteners to the edge of a sheet of material comprising cooperating jaw and anvil means having shoulders for forming a U-shaped staple with offsets in a plane parallel to said sheet intermediate the ends of the legs of the staple, means for applying the staple to said sheet with the offsets at said edge, and means for folding the free ends of the legs over said edge and offsets.

4. A machine for applying wire fasteners to the edge of a sheet of material comprising cooperating jaw and anvil means having shoulders for forming a U-shaped staple with a loop portion and an end portion of greater width and offsets between the two portions, means for applying the staple to said sheet with said end portion extending through the sheet in spaced relation to said edge and folded along opposite sides of the sheet to said edge, and means for folding the free ends of said end portion over said edge and offsets.

5. A machine for applying wire fasteners to the edge of a sheet of material comprising cooperating jaw and anvil means having shoulders for forming a U-shaped staple with offsets intermediate the ends of the legs of the staple, means for applying the staple to said sheet with the offsets at said edge, and means for folding the free ends of the legs over said edge and offsets and crimping the tips of said ends toward the sheet.

6. A machine for applying wire fasteners to the edge of a sheet of material comprising cooperating jaw and anvil means having shoulders for forming a U-shaped staple with a loop portion and an end portion of different widths and offsets between the two portions, means for applying the staple to said sheet with said end portion extending through the sheet in spaced relation to said edge and folded substantially perpendicularly to said edge along opposite sides of the sheet, with the offsets at said edge, and means for folding the free ends of said end portion obliquely over said edge and offsets.

7. A machine for applying wire fasteners to the edge of a sheet of material comprising cooperating jaw and anvil means having shoulders for forming a U-shaped staple with offsets intermediate the ends of the legs of the staple, means for applying the staple to said sheet with the offsets at said edge, and means for folding the free ends of the legs obliquely over said edge and offsets.

8. A machine for applying wire fasteners to the edge of a sheet of material comprising cooperating jaw and anvil means having shoulders for forming a U-shaped staple with a loop portion and an end portion of different widths and offsets between the two portions, means for driving the end portion of the staple through said sheet in spaced relation to said edge, means for folding the end portion along opposite sides of the sheet to said edge, with said offsets at the edge, and means for folding the free ends of said end portion over said edge and offsets and crimping the tips of said ends toward the sheet.

9. A machine for applying wire fasteners to the edge of a sheet of material comprising means for driving the end of a piece of wire through the sheet and means for bending said end toward said edge and thence bending it over the edge, the latter means comprising a tool having a portion which reciprocates along the plane of said sheet and thence moves transversely of said plane.

10. A machine for applying wire fasteners to the edge of a sheet of material comprising means for driving the end of a piece of wire through the sheet, means for bending said end toward said edge and thence bending it over said edge, the latter means comprising a tool movable along the plane of said sheet and thence transversely of said plane, said tool having a curved wiper protruding from the side thereof laterally of the plane of its path of movement.

11. A machine for applying wire fasteners to the edge of a sheet of material comprising means for driving the end of a piece of wire through the sheet and means for bending said end toward said edge and thence bending it over the edge, the latter means comprising a tool movable approximately parallel to the plane of said sheet and thence transversely of said plane, said tool having a lateral protuberance projecting along the sheet for effecting the first bending operation.

12. A machine for applying wire fasteners to the edge of a sheet of material comprising means for driving the end of a piece of wire through the sheet and means for bending said end toward said edge and thence bending it over said edge, the latter means comprising a tool movable approximately parallel to the plane of said sheet and thence transversely of said plane, said tool having a lateral protuberance projecting along the sheet for effecting the first bending operation with one side of the protuberance and the second bending operation with another side thereof.

13. A machine for applying wire fasteners to the edge of a sheet of material comprising means for driving the end of a piece of wire through the sheet, means for bending said end toward said edge and thence over the edge, and means for bending said end along the opposite side of the sheet, the latter means comprising a tool having a portion which reciprocates along the plane of the sheet and thence moves toward said plane.

14. A machine for applying wire fasteners to the edge of a sheet of material comprising means for applying a U-shaped staple to the sheet with the loop and free ends of the staple bent along opposite sides of the sheet toward said edge, and means for bending said ends over said edge and over the two sides of the loop respectively, the latter means comprising a tool movable along the plane of the sheet and thence toward said plane.

15. A machine for applying wire fasteners to the edge of a sheet of material comprising means for driving a U-shaped staple through the sheet, means for bending the loop of the staple along one side of the sheet toward said edge, tools movable along the plane of the sheet and thence transversely of said plane for bending the free ends of the staple toward said edge and thence over the edge, and tools movable along the plane of the sheet and thence toward said plane for bending said ends over the two sides of the loop respectively.

16. A machine for applying wire fasteners to the edge of a sheet of material comprising means for applying a U-shaped staple to the sheet with the loop and free ends of the staple bent along opposite sides of the sheet toward said edge, and means for bending said ends over said edge and over the two sides of the loop respectively, the latter means comprising tools having noses for pushing said ends, each nose being movable along the plane of the sheet to bend one of said ends toward the sheet and then movable toward said plane to crimp the tip of the end substantially against the sheet.

ARTHUR J. LEWIS.